(12) United States Patent
Kayama

(10) Patent No.: US 9,727,731 B2
(45) Date of Patent: Aug. 8, 2017

(54) SETTING METHOD, PROGRAM, AND INFORMATION PROCESSING APPARATUS

(71) Applicant: KABUSHIKI KAISHA TOSHIBA, Tokyo (JP)

(72) Inventor: Akemi Kayama, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 359 days.

(21) Appl. No.: 14/034,145

(22) Filed: Sep. 23, 2013

(65) Prior Publication Data

US 2014/0181494 A1   Jun. 26, 2014

Related U.S. Application Data

(63) Continuation of application No. PCT/JP2013/059043, filed on Mar. 27, 2013.

(30) Foreign Application Priority Data

Dec. 21, 2012 (JP) ................................. 2012-279765

(51) Int. Cl.
*G06F 21/57* (2013.01)

(52) U.S. Cl.
CPC .................................. *G06F 21/575* (2013.01)

(58) Field of Classification Search
CPC ................................................... G06F 9/4406
USPC ............................................................ 713/2
See application file for complete search history.

(56) References Cited

U.S. PATENT DOCUMENTS

| 6,560,701 B1 * | 5/2003 | Berstis | G06F 11/1417 |
| | | | 713/2 |
| 6,996,706 B1 * | 2/2006 | Madden | G06F 9/4406 |
| | | | 711/113 |
| 7,363,480 B1 * | 4/2008 | Righi | G06F 8/65 |
| | | | 709/219 |
| 2003/0084337 A1 * | 5/2003 | Simionescu | G06F 9/4416 |
| | | | 713/190 |
| 2004/0078680 A1 | 4/2004 | Hu et al. | |
| 2004/0117608 A1 | 6/2004 | Rothman et al. | |

(Continued)

FOREIGN PATENT DOCUMENTS

| JP | 8-147062 | 6/1996 |
| JP | 9-16380 | 1/1997 |

(Continued)

OTHER PUBLICATIONS

International Search Report & Written Opinion of PCT Application No. PCT/JP2013/059043 filed Mar. 27, 2013, 22 pgs.

(Continued)

*Primary Examiner* — Jaweed A Abbaszadeh
*Assistant Examiner* — Sumil Desai
(74) *Attorney, Agent, or Firm* — Knobbe, Martens, Olson & Bear, LLP

(57) ABSTRACT

According to one embodiment, a setting method, includes storing, in a first partition of a storage which stores a first file causing a processor to execute a first program to booting an operating system, a second file having a same path as a path of the first file and causing the processor to execute a second program. The second program is executed by the processor at activation of an information processing apparatus and causing the processor to execute the first program.

4 Claims, 9 Drawing Sheets

(56) References Cited

U.S. PATENT DOCUMENTS

| | | | | |
|---|---|---|---|---|
| 2009/0086981 A1* | 4/2009 | Kumar | ................. | G06F 21/575 380/285 |
| 2011/0131181 A1 | 6/2011 | Ikuta et al. | | |
| 2012/0011354 A1* | 1/2012 | Owen | ................... | G06F 9/4408 713/2 |
| 2014/0122329 A1* | 5/2014 | Naggar | .............. | G06Q 20/3552 705/41 |

FOREIGN PATENT DOCUMENTS

| | | |
|---|---|---|
| JP | 2000-207178 | 7/2000 |
| JP | 2002-351723 | 12/2002 |
| JP | 2004-038931 | 2/2004 |
| JP | 2005-78455 | 3/2005 |
| JP | 2006-331380 | 12/2006 |
| JP | 2011-113397 | 6/2011 |
| WO | WO 2014/097658 A1 | 6/2014 |

OTHER PUBLICATIONS

International Search Report in PCT Application No. PCT/JP2013/059043, mailed Jun. 18, 2013.
International Search Report & Written Opinion of PCT Application No. PCT/JP2013/059043 dated Mar. 27, 2013.

* cited by examiner

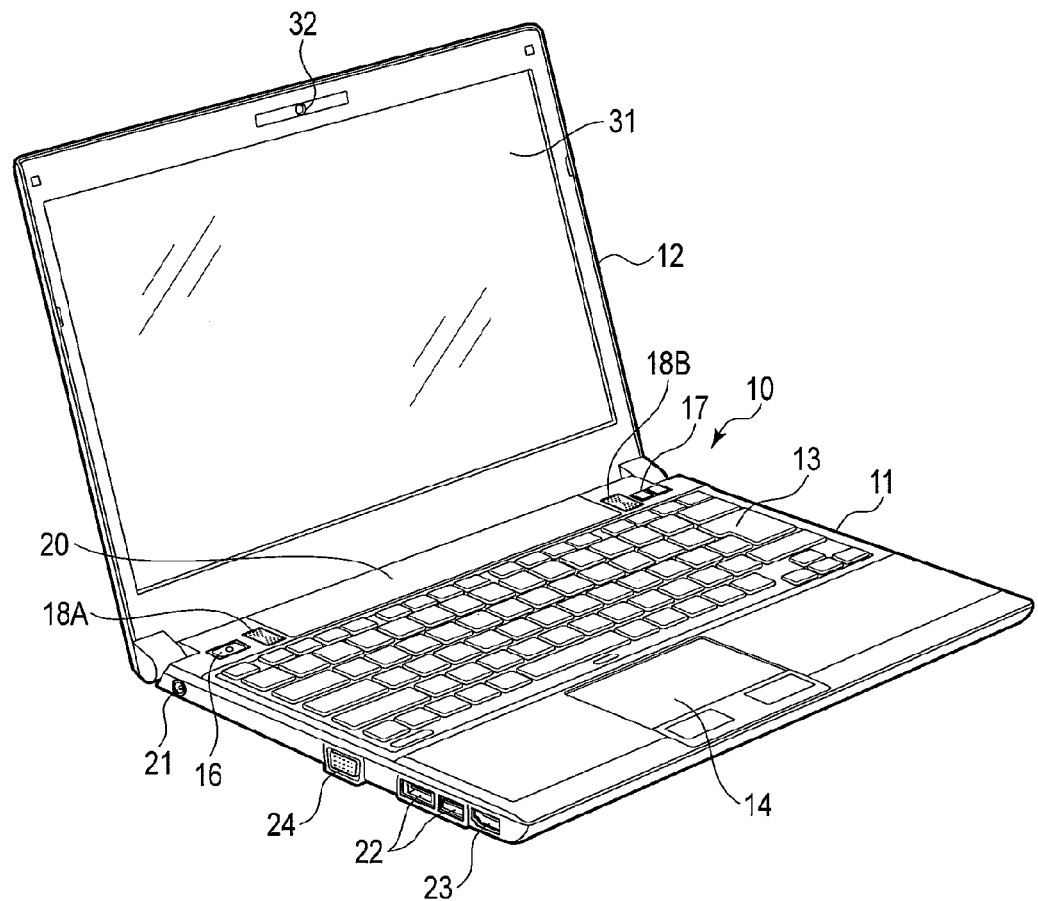
F I G. 1

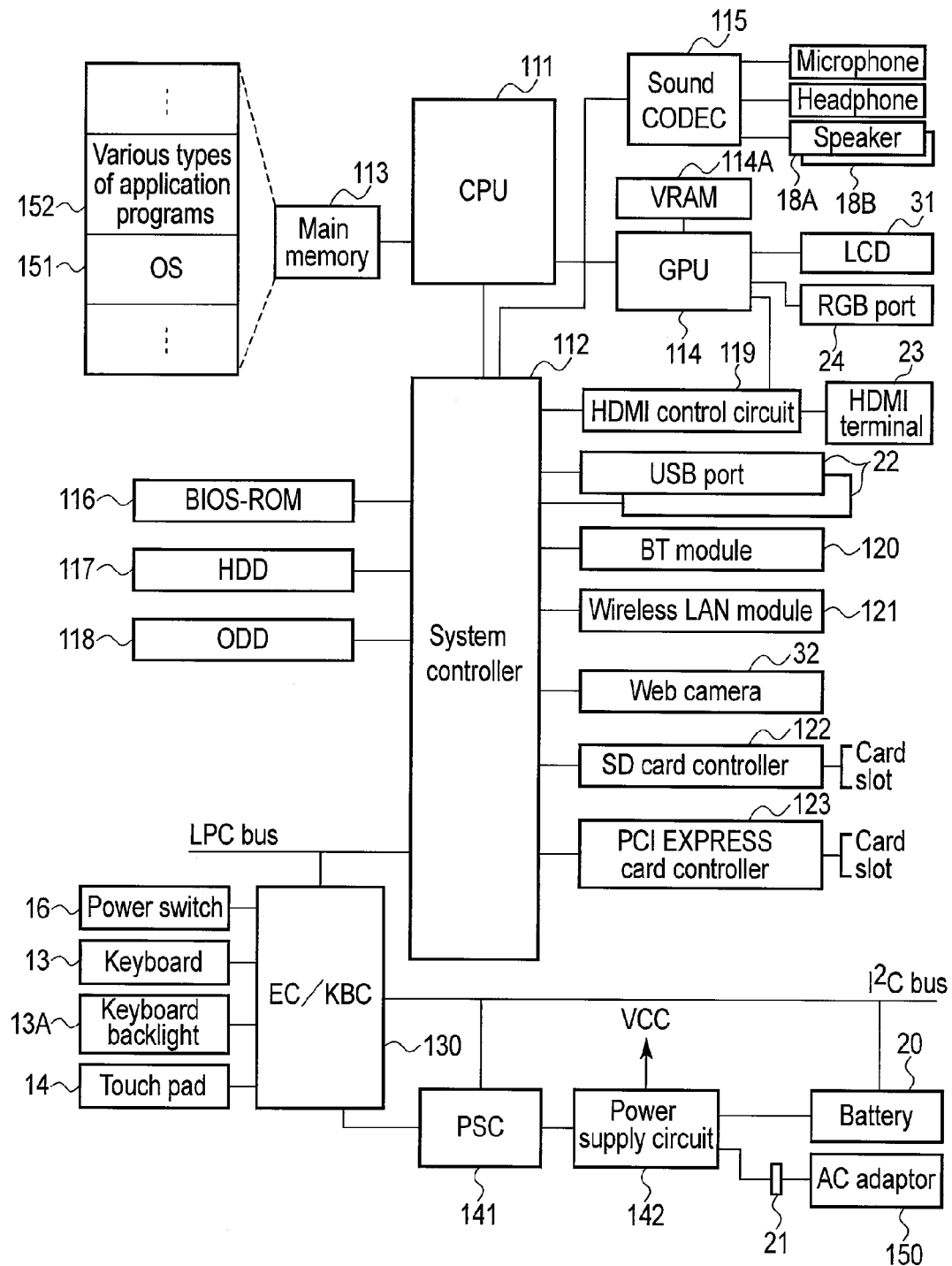
F I G. 2

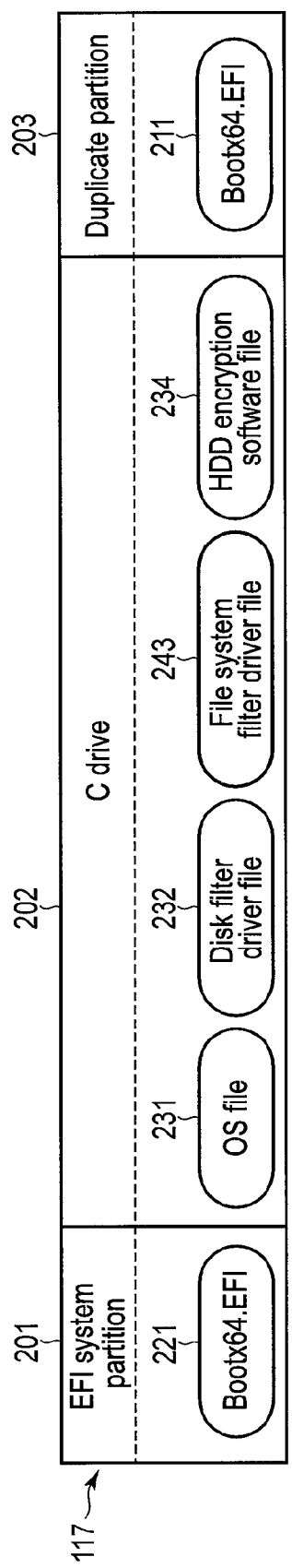
F I G. 12

SETTING METHOD, PROGRAM, AND INFORMATION PROCESSING APPARATUS

CROSS REFERENCE TO RELATED APPLICATIONS

This application is a Continuation application of PCT Application No. PCT/JP2013/059043, filed Mar. 27, 2013 and based upon and claiming the benefit of priority from Japanese Patent Application No. 2012-279765, filed Dec. 21, 2012, the entire contents of all of which are incorporated herein by reference.

FIELD

Embodiments described herein relate generally to a setting method, a program, and an information processing apparatus for changing a sequence of files to be read at boot.

BACKGROUND

A BIOS has been widely used as firmware for interface between an operating system and hardware, but EFI (Extensible Firmware Interface) has been gradually employed instead of the BIOS.

In a system employing EFI, a conventional MBR (Master Boot Record) is not employed at booting of an operating system. The operating system is booted by an EFI boot manager. The EFI boot manager is executed by a CPU based on a boot file in an EFI system partition of an HDD.

The EFI system partition is basically located at a leading part of the HDD and is formatted by a FAT32 file system. The boot file is stored in, for example, EFI\<vender name> folder. A booting sequence of the boot file can be changed based on a boot variable indicating a path of a file stored in a nonvolatile memory of the EFI system. If there is no setting, a file in a default file path (EFI\Boot\Bootx64.EFI for x64) is booted.

If the booting sequence of the boot file is changed, the booting sequence can be changed based on a boot variable. However, the booting sequence is not often referred to for equipment of the EFI.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an outer appearance of an information processing apparatus according to the embodiments.

FIG. 2 is an exemplary block diagram showing a system configuration of the information processing apparatus according to the embodiments.

FIG. 12 is an exemplary illustration showing a state of the HDD after installation of the HDD encryption software.

DETAILED DESCRIPTION

Figure 3:
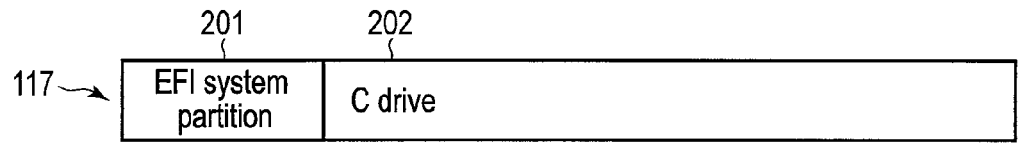
FIG. 3 is an exemplary illustration showing a configuration of a partition in an HDD.

Various embodiments will be described hereinafter with reference to the accompanying drawings.

In general, according to one embodiment, a setting method, includes storing, in a first partition of a storage which stores a first file causing a processor to execute a first program to boot an operating system, a second file having a same path as a path of the first file and causing the processor to execute a second program. The second program is executed by the processor at activation of an information processing apparatus and causing the processor to execute the first program.

First Embodiment

First, a configuration of an information processing apparatus according to one of the embodiments will be described with reference to FIG. 1 to FIG. 2. The information processing apparatus can be implemented as, for example, a notebook-type portable personal computer.

FIG. 1 is a perspective view showing a notebook computer 10 having a display unit opened as seen from a front side. The computer 10 is configured to be supplied with an electric power from a battery 20. The computer 10 comprises a computer body 11 and a display unit 12. A display device such as a liquid crystal device (LCD) 31 is incorporated into the display unit 12. Furthermore, a camera (Web camera) 32 is arranged at an upper end portion of the display unit 12.

The display unit 12 is attached to the computer body 11 so as to freely pivot between an opened position at which an upper surface of the computer body 11 is exposed and a closed position at which the upper surface of the computer body 11 is covered with the display unit 12. The computer body 11 comprises a housing shaped in a thin box. On the top surface, a keyboard 13, a touch pad 14, a power switch 16 for power-on/power-off of the computer 10, some function buttons 17, and speakers 18A and 18B are arranged.

In addition, the computer body 11 is provided with a power supply connector 21. The power supply connector 21 is arranged on a side surface, for example, a left side surface of the computer body 11. An external power supply is detachably connected with the power supply connector 21. An AC adapter can be employed as the external power supply. The AC adapter is a power supply device configured to convert a commercial power supply (AC power) into DC power.

The battery 20 is detachably mounted on, for example, a rear end portion of the computer body 11. The battery 20 may be a battery built in the computer 10.

The computer 10 is driven by an electric power from the external power supply or an electric power from the battery 20. If the external power supply is connected to the power supply connector 21 of the computer 10, the computer 10 is driven by the electric power from the external power supply. The electric power from the external power supply is also used to charge the battery 20. The computer 10 is driven by the electric power from the battery 20 over a period during which the external power supply is not connected to the power supply connector 21 of the computer 10.

Furthermore, the computer body 11 is provided with some USB ports 22, an HDMI (High-Definition Multimedia Interface) output terminal 23, and an RGB port 24.

FIG. 2 shows a system configuration of the computer 10. The computer 10 comprises a CPU 111, a system controller 112, a main memory 113, a graphics processing unit (GPU) 114, a sound codec 115, a BIOS-ROM 116, a hard disk drive (HDD) 117, an optical disk drive (ODD) 118, a BT (Bluetooth (registered trademark)) module 120, a wireless LAN module 121, an SD card controller 122, a PCI EXPRESS card controller 123, an embedded controller/keyboard controller IC (EC/KBC) 130, a keyboard backlight 13A, a power supply controller (PSC) 141, a power supply circuit 142, etc.

The CPU 111 is a processor which controls operations of respective components of the computer 10. The CPU 111 executes various types of software loaded from the HDD 117 serving as a storage onto the main memory 113. The software includes an operating system (OS) 151 and various types of application programs 152.

In addition, the CPU 111 also executes a basic input output system (BIOS) stored in the BIOS-ROM 116 which is a nonvolatile memory. The BIOS is a system program for hardware control.

The GPU 114 is a display controller which controls the LCD 31 employed as a display monitor of the computer 10. The GPU 114 generates a display signal (LVDS signal) which should be supplied to the LCD 31 from display data stored in a video memory (VRAM) 114A. Furthermore, the GPU 114 can also generate an analog RGB signal and an HDMI signal from the display data. The analog RGB signal is supplied to an external display via the RGB port 24. HDMI terminal 23 can send an HDMI video signal (uncompressed digital image signal) and a digital audio signal to the external display by means of a cable. An HDMI control circuit 119 is an interface which sends the HDMI video signal and the digital audio signal to the external display via the HDMI output terminal 23.

The system controller 112 is a bridge device which makes connection between the CPU 111 and each of the components. A serial ATA controller which controls the hard disk drive (HDD) 117 and the optical disk drive (ODD) 118 is built in the system controller 112. The system controller 112 executes communication with each of the devices on an LPC (Low PIN Count) bus.

The EC/KBC 130 is connected to the LPC bus. The EC/KBC 130, the power supply controller (PSC) 141 and the battery 20 are interconnected via a serial bus such as an I²C bus.

The EC/KBC 130 is a power management controller which executes power management of the computer 10 and is implemented as a one-chip microcomputer in which, for example, a keyboard controller configured to control the keyboard (KB) 13, the touch pad 14, etc. is built. The EC/KBC 130 has a function to power on and off the computer 10 in response to user operations of the power switch 16. The control to power on and off the computer 10 is executed by a cooperative operation of the EC/KBC 130 and the power supply controller (PSC) 141. When the power supply controller (PSC) 141 receives an ON signal sent from the EC/KBC 130, the power supply controller (PSC) 141 controls the power supply circuit 142 to power on the computer 10. In addition, when the power supply controller (PSC) 141 receives an OFF signal sent from the EC/KBC 130, the power supply controller (PSC) 141 controls the power supply circuit 142 to power off the computer 10. The EC/KBC 130, the power supply controller (PSC) 141 and the power supply circuit 142 also operate with the electric power from the battery 20 or an AC adapter 150 over a period in which the computer 10 is powered on.

Furthermore, the EC/KBC 130 can turn on/off the keyboard backlight 13A arranged on a back surface of the keyboard 13. The EC/KBC 130 is connected to a panel opening/closing switch 131 configured to detect opening/closing of the display unit 12. If the opening of the display unit 12 is detected by the panel opening/closing switch 131, the EC/KBC 130 can also power on the computer 10.

The power supply circuit 142 generates the electric power (operational power supply) which should be supplied to each of the components, by using the electric power from the battery 20 or the electric power from the AC adaptor 150 connected to the computer body 11 as the external power supply.

Currently, computers using UEFI (Unified Extensible Firmware Interface) (hereinafter called EFI) as the specification to define the software interface between the firmware of BIOS-ROM, etc. and the operating system 151 are on sale.

In a system using the EFI, conventional MBR (Master Boot Record) is not used at booting of the operating system 151. The operating system 151 is booted by an EFI boot manager. The EFI boot manager executed by the CPU 111 based on a boot file in an EFI system partition in the HDD 117. The EFI system partition is identified by GUID (Globally Unique Identifier) indicating the type of the partition. The GUID is described in GPT (GUID Partition Table).

Figure 4:
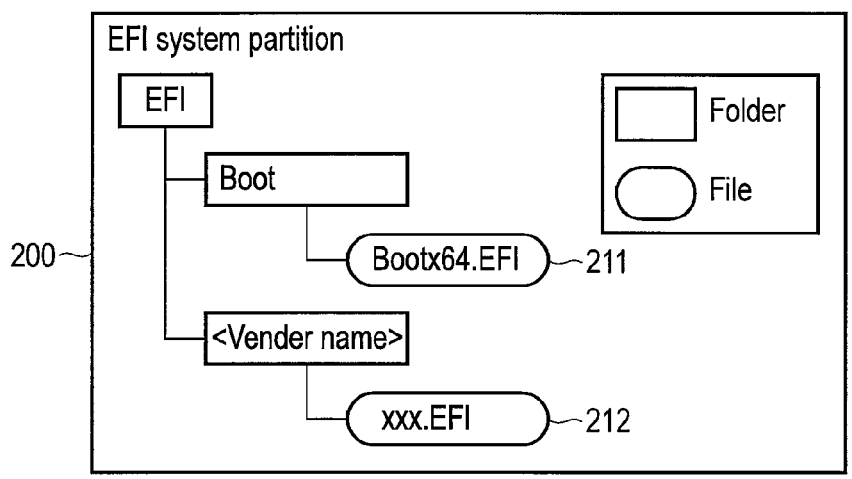
FIG. 4 is an exemplary illustration showing a configuration of an EFI system partition.

FIG. 3 is an illustration showing a configuration of the partition in the HDD 117. FIG. 4 is an illustration showing a configuration of the EFI system partition.

An EFI system partition 201 is basically at a leading part of the HDD 117 and is formatted in a FAT32 file system. For example, a C drive 202 is set after the EFI system partition 201 in the HDD 117. A boot file 212 is stored in, for example, EFI\<vender name> folder. A booting sequence of the boot file can be changed by a boot variable indicating a path of the file stored in a nonvolatile memory (for example, BIOS-ROM) in the EFI system. If there is no setting, etc., a file 211 in a default file path (EFI\Boot\Bootx64.EFI for x64) is booted.

Incidentally, If the booting sequence of the boot file is changed, the booting sequence can be changed based on the boot variable. However, the booting sequence is not often referred to for equipment of the EFI.

In the present embodiment, a method of certainly changing the booting sequence of the boot file will be described. A method of changing the booting sequence of the boot file when an HDD encryption software operating in the operating system 151 is installed will be hereinafter described. The software boots the operating system 151 after pre-boot authentication. In addition, a disk is encrypted in unit of sector, and access to an encrypted region is transparently executed by a disk filter driver.

In an original boot manager, the encrypted data cannot be decrypted. A pre-boot manager which allows the encrypted data to be decrypted and which delivers the decrypted data to the boot manager is booted before booting the boot manager. More specifically, the boot manager can transparently access the encrypted data by the pre-boot manager hooking the access to the disk.

Steps of storing the pre-boot file to cause the CPU 111 to execute the pre-boot manager in the HDD 117 at installing the HDD encryption software will be hereinafter described. The steps to be described below are processing executed by an installer which is the program executed by the CPU 111. A file to execute the installer is stored in, for example, a storage medium together with files to execute the HDD encryption software and programs associated with the HDD encryption software.

Figure 5:
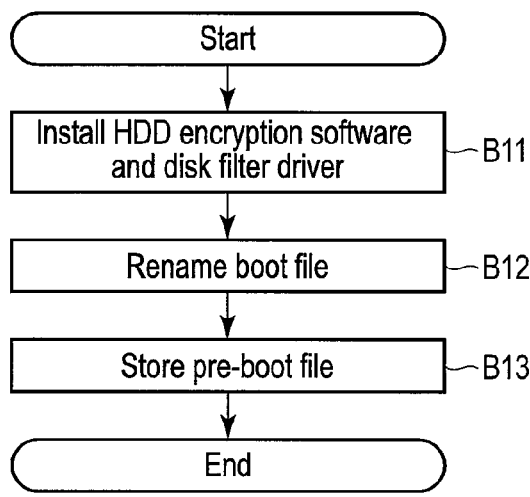
FIG. 5 is an exemplary flowchart showing steps of installing HDD encryption software.
Figure 6:
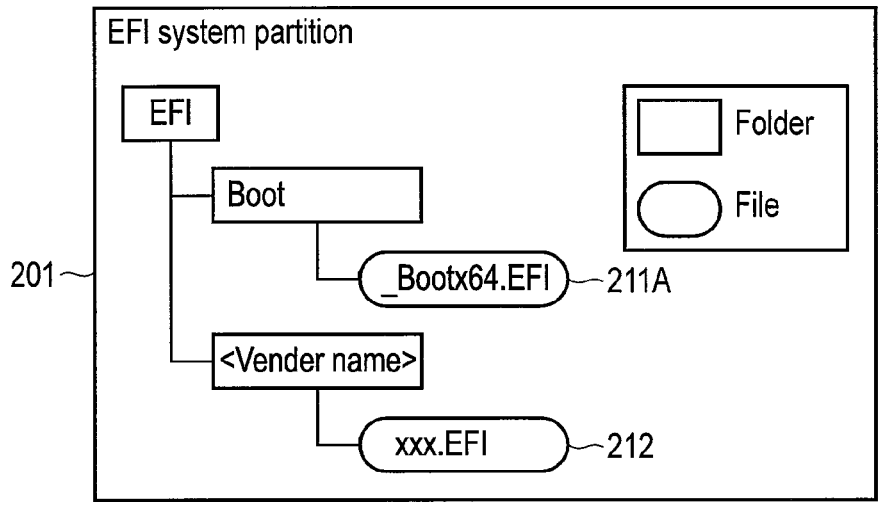
FIG. 6 is an exemplary illustration for explanation of the steps of installing the HDD encryption software.
Figure 7:
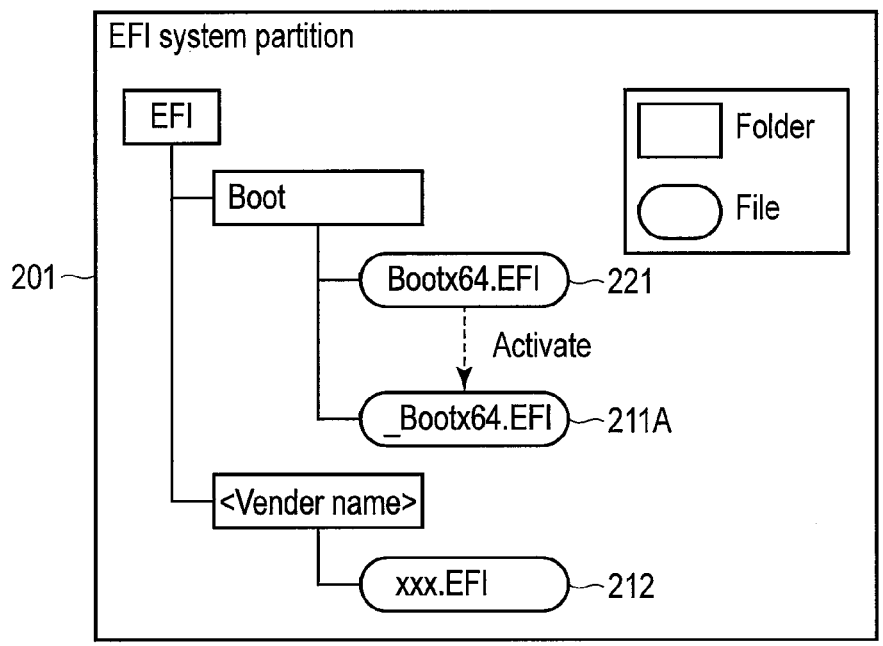
FIG. 7 is an exemplary illustration for explanation of the steps of installing the HDD encryption software.

FIG. 5 is a flowchart showing steps of installing the HDD encryption software. FIG. 6 is an illustration for explanation of the steps of installing the HDD encryption software. FIG. 7 is an illustration for explanation of the steps of installing the HDD encryption software.

The installer installs the HDD encryption software, a disk filter driver and a file system filter driver in the computer (step B11). The file system filter driver redirects an original EFI boot file when an access to the pre-boot file is requested. By the file system filter driver redirecting the original EFI boot file, the EFI boot file can be updated when the pre-boot file is changed by an updating function. An HDD encryption software file for causing the CPU 111 to execute the HDD encryption software, a disk filter driver file for causing the CPU 111 to execute the disk filter driver, and a file system filter driver file for causing the CPU 111 to execute the file system filter driver are stored in the C drive 202 in the HDD 117 by the installation.

The installer changes a file name of a default EFI boot file 211 stored in the EFI system partition 201 to a predetermined file name (step B12). For example, the file name is changed from "Bootx64.EFI" to "_Bootx64.EFI" as shown in FIG. 6 (221A in FIG. 6).

Subsequently, as shown in FIG. 7, the installer stores a pre-boot file 221 having a function to decrypt the encrypted data in the C drive 202, and having the same file name as a file name of the default EFI boot file 211 in the EFI system partition 201 (step B13).

The pre-boot manager is set to invoke the EFI boot file having a predetermined name in the same folder in the EFI system partition 201 and to boot the boot manager. At the booting, the pre-boot manager is executed by the EFI pre-boot file 221 having the same path as the EFI boot file 211. An EFI boot manager invokes an EFI boot file 211A having a predetermined name in the same folder and causes the boot manager to be booted. The boot manager causes the operating system 151 to be booted. A reading sequence of the boot file can be therefore changed.

Figure 8:
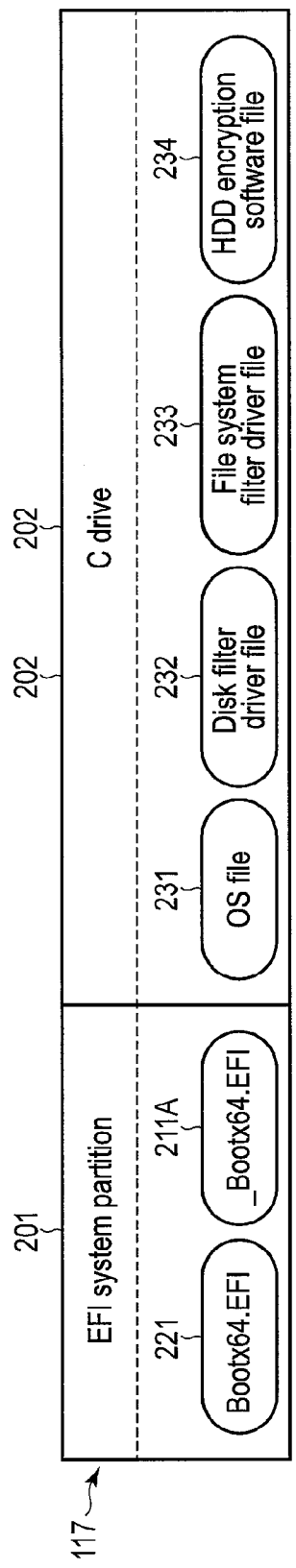
FIG. 8 is an exemplary illustration showing a state of the HDD after installation of the HDD encryption software.

FIG. 8 is an illustration showing an example of a state of the HDD 117 after the installation of the HDD encryption software.

The EFI boot file 211A having the name changed and the EFI pre-boot file 221 are stored in the EFI system partition 201 in the HDD 117. An OS file 231 to cause the CPU 111 to execute the operating system 151, a disk filter driver file 232 to cause the CPU 111 to execute the disk filter driver, a file system filter driver file 233 to cause the CPU 111 to execute the file system filter, and an HDD encryption software file 234 to cause the CPU 111 to execute the HDD encryption software are stored in the C drive 202 in the HDD 117.

Second Embodiment

Next, another method of changing a booting sequence of a boot file will be described.

Figure 9:
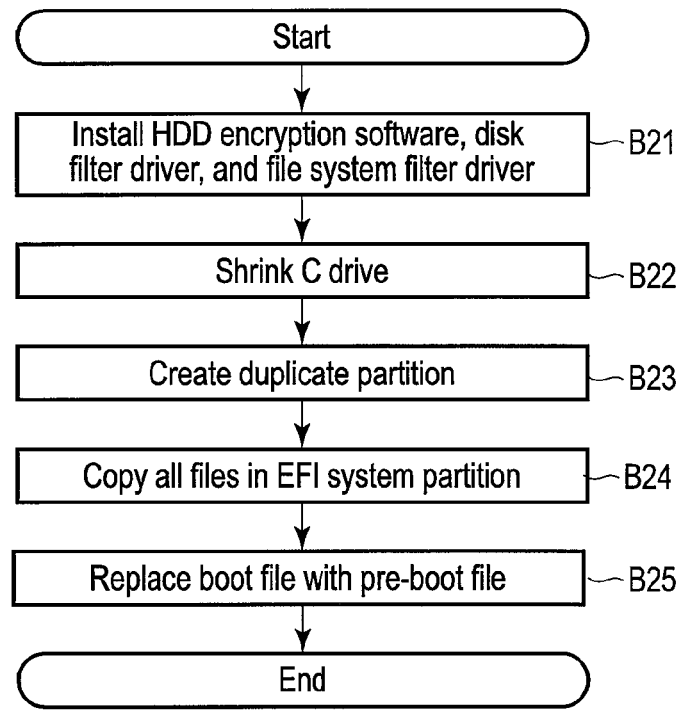
FIG. 9 is an exemplary flowchart showing steps of installing the HDD encryption software.
Figure 10:
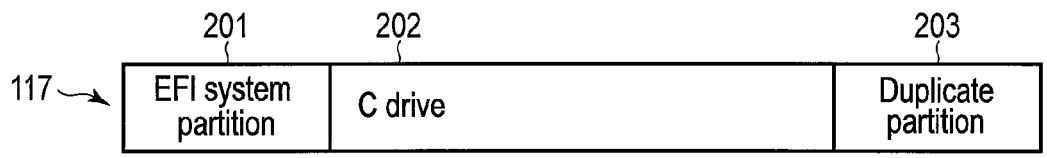
FIG. 10 is an exemplary illustration for explanation of the steps of installing the HDD encryption software.
Figure 11:
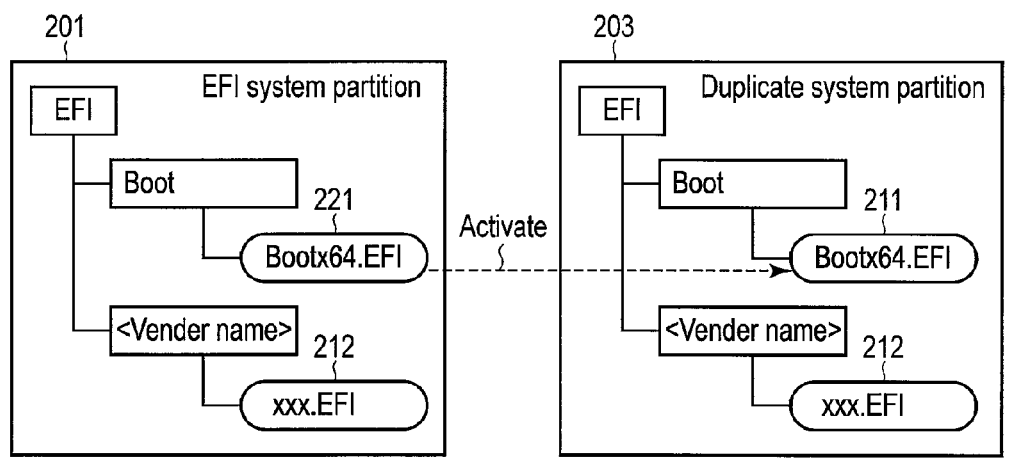
FIG. 11 is an exemplary illustration for explanation of the steps of installing the HDD encryption software.

FIG. 9 is a flowchart showing steps of installing HDD encryption software. FIG. 10 is an illustration for explanation of the steps of installing the HDD encryption software. FIG. 11 is an illustration for explanation of the steps of installing the HDD encryption software.

First, an installer installs HDD encryption software and a disk filter driver in a computer (step B21). A file system filter driver redirects an original EFI boot file when an access to a pre-boot file is requested. By redirecting the original EFI boot file by the file system filter driver, an EFI boot file can be updated when the pre-boot file is changed by an updating function. An HDD encryption software file to cause a CPU 111 to execute the HDD encryption software and a disk filter driver file to cause a CPU 111 to execute the disk filter driver are stored in a C drive 202 in an HDD 117 by installation.

The installer shrinks the C drive 202 (step B22). The installer creates a partition (hereinafter called a duplicate partition) of the same size as an EFI system partition in a free space (step B23). A disk configuration obtained after the creation of the duplicate partition is shown in FIG. 10. As shown in FIG. 10, the C drive 202 in the HDD 117 is shrunk and a duplicate partition 203 is created in the HDD 117.

The installer copies all of files in an EFI system partition 201, in the duplicate partition 203 (step B24). A folder configuration is also recreated at the copying.

Next, the installer replaces an OS boot file 211 stored in an EFI system partition 201 with a pre-boot file 221 (step B24). File configurations in the EFI system partition and the duplicated partition are shown in FIG. 11. As shown in FIG. 11, the EFI pre-boot file 221 having the same path as the original EFI boot file 211 is stored in the EFI system partition 201. The EFI boot file 211 is stored in the duplicate partition 203.

Since the path of the EFI pre-boot file 221 is the same as the path of the original EFI boot file 211, the new pre-boot file 221 is certainly booted prior to the booting of an operating system 151.

A pre-boot manager is set to invoke the EFI boot file having a predetermined path in the created duplicate partition 203 and to boot the boot manager. The predetermined path is the same path as the path of the pre-boot file 221. At the booting, the pre-boot manager is executed by the pre-boot file 221 having the same path as the EFI boot file 211. An EFI boot manager invokes the EFI boot file 211 and causes the boot manager to be booted after pre-boot authentication is completed as user authentication obtained prior to the booting of the operating system 151. The boot manager causes the operating system 151 to be booted. A reading sequence of the boot file can be therefore changed. Since the pre-boot manager has a decrypting function, the duplicate partition 203 may be encrypted.

FIG. 12 is an illustration showing a state of the HDD 117 after the installation of the HDD encryption software.

The EFI pre-boot file 221 is stored in the EFI system partition 201 in the HDD 117. An OS file 231 to cause the CPU 111 to execute the operating system 151, a disk filter driver file 232 to cause the CPU 111 to execute the disk filter driver, and an HDD encryption software file 243 to cause the CPU 111 to execute the HDD encryption software are stored in the C drive 202 in the HDD 117. The EFI boot file 211 is stored in the EFI system partition 201 in the HDD 117.

The file system file driver redirects the files in the duplicate partition 203 in response to an access of the files into the EFI system partition 201.

Figure 13:
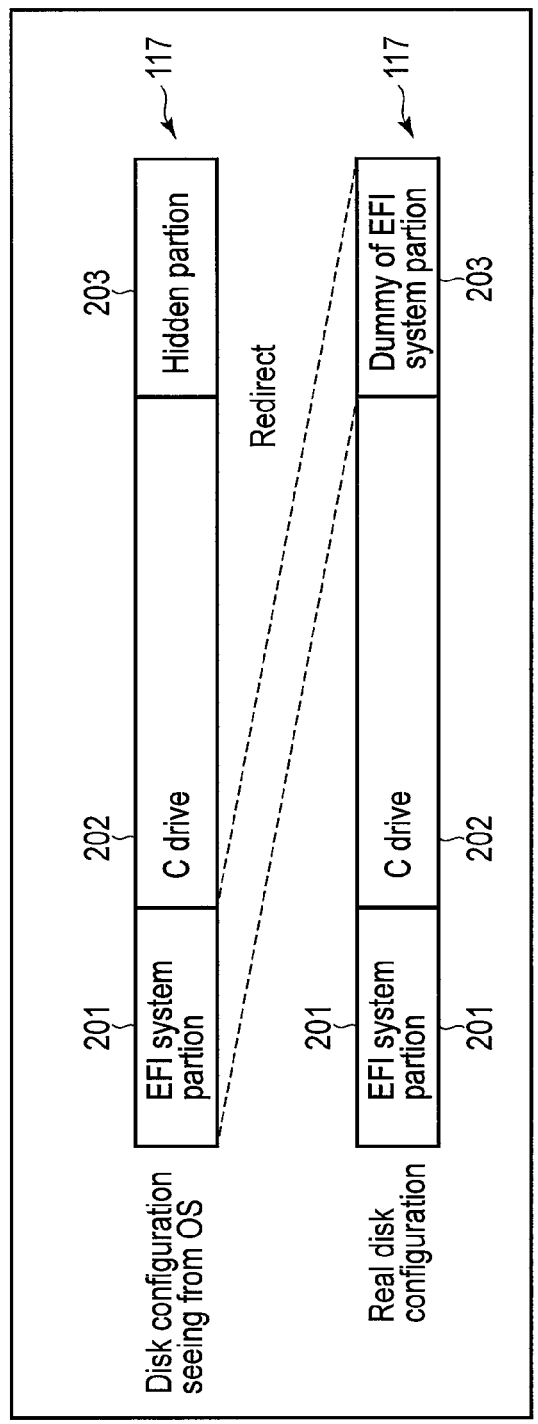
FIG. 13 is an exemplary illustration showing a summary of redirect.

FIG. 13 is an illustration showing a summary of the redirection.

All of accesses to the EFI system partition 201 from the OS are accesses to the duplicate partition 203.

Since the processing steps of the present embodiment can be executed by the computer program, the same advantages as those of the present embodiment can be implemented by merely executing the computer program by the computer via a computer-readable storage medium which stores the files to execute the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of changing a reading sequence of a boot file in a system comprising a CPU and a nonvolatile memory when installing a software to be operated on an operating system,
wherein
the CPU is configured to execute the operating system;
the nonvolatile memory comprises a first area and a second area;
the first area comprises a system partition storing a default boot file, a file name of the default boot file being a first file name;
the second area stores the operating system, the software, and a program associated with the software;
an installer executed by the CPU is configured to
change a file name of the default boot file stored in the system partition from the first file name to a second file name, the second file name including the whole of the first file name and a name element,
store a pre-boot file in the system partition, a file name of the pre-boot file being the first file name, and
boot a pre-boot manager by reading the pre-boot file having the first file name from the system partition when the CPU is booted;
the pre-boot manager is configured to boot a boot manager by reading the boot file having the second file name from the system partition; and
the boot manager is configured to boot the operating system.

2. An electric apparatus of changing a reading sequence of a boot file when installing a software to be operated on an operating system, the electric apparatus comprising:
a CPU configured to execute the operating system; and
a nonvolatile memory comprising a first area and a second area, the first area comprising a system partition storing a default boot file, a file name of the default boot file being a first file name, the second area storing the operating system, the software, and a program associated with the software,
wherein
the CPU executes an installer which is configured to
change a file name of the default boot file stored in the system partition from the first file name to a second file name, the second file name including the whole of the first file name and a name element,
store a pre-boot file in the system partition, a file name of the pre-boot file being the first file name, and
boot a pre-boot manager by reading the pre-boot file having the first file name from the system partition when the CPU is booted;
the pre-boot manager is configured to boot a boot manager by reading the boot file having the second file name from the system partition; and
the boot manager is configured to boot the operating system.

3. A method of changing a reading sequence of a boot file in a system comprising a CPU and a nonvolatile memory when installing a software to be operated on an operating system,
wherein
the CPU is configured to execute the operating system;
the nonvolatile memory comprises a first area and a second area;
the first area comprises a system partition storing first files including a default boot file;
the second area stores the operating system, the software, and a program associated with the software;
an installer executed by the CPU is configured to
shrink the second area to set a free space in the second area,
store a duplicate partition in the free space, the duplicate partition having a same size as a size of the system partition,
copy the first files of the system partition in the duplicate partition so that the duplicate partition stores duplicate first files including a duplicate default boot file as a pre-boot file,
replace the default boot file in the system partition with the pre-boot file in the duplicate partition so that the system partition stores the pre-boot file and the duplicate partition stores the duplicate default boot file, and
boot a pre-boot manager by reading the pre-boot file in the system partition when the CPU is booted;
the pre-boot manager is configured to boot a boot manager by reading the duplicate default boot file in the duplicate partition, and
the boot manager is configured to boot the operating system.

4. An electric apparatus of changing a reading sequence of a boot file when installing a software to be operated on an operating system, the electric apparatus comprising:
a CPU configured to execute the operating system; and
a nonvolatile memory comprising a first area and a second area, the first area comprising a system partition storing first files including a default boot file, the second area storing the operating system, the software, and a program associated with the software,
wherein
the CPU executes an installer which is configured to
shrink the second area to set a free space in the second area,
store a duplicate partition in the free space, the duplicate partition having a same size as a size of the system partition, copy the first files of the system partition in the duplicate partition so that the duplicate partition stores duplicate first files including a duplicate default boot file as a pre-boot file, replace the default boot file in the system partition with the pre-boot file in the duplicate partition so that the system partition stores the pre-boot file and the duplicate partition stores the duplicate default boot file, and boot a pre-boot manager by reading the pre-boot file in the system partition when the CPU is booted;

the pre-boot manager is configured to boot a boot manager by reading the duplicate default boot file in the duplicate partition; and the boot manager is configured to boot the operating system.

* * * * *